United States Patent
Ostroski

[11] 3,778,892
[45] Dec. 18, 1973

[54] METHOD OF PRODUCING DOUBLE-INSULATED ARMATURE SUB-ASSEMBLIES

[75] Inventor: Richard J. Ostroski, Glen Arm, Md.

[73] Assignee: The Black and Decker Manufacturing Company, Towson, Md.

[22] Filed: Aug. 4, 1972

[21] Appl. No.: 278,053

[52] U.S. Cl. ............... 29/598, 156/294, 156/295, 310/42, 310/45, 310/217
[51] Int. Cl. ......................................... H02k 15/02
[58] Field of Search ............... 29/596, 597, 598, 29/609; 156/293, 294, 295; 310/42, 43, 45, 261, 217

[56] References Cited
UNITED STATES PATENTS

| | | | |
|---|---|---|---|
| 2,751,525 | 6/1956 | Hekelaar | 336/233 X |
| 2,978,371 | 4/1961 | Baciu | 310/45 X |
| 3,673,040 | 6/1972 | Hill | 156/294 |
| 3,204,134 | 8/1965 | Schneider | 310/45 |
| 3,387,839 | 6/1968 | Miller et al. | 156/294 X |
| 3,620,886 | 11/1971 | Sims et al. | 29/609 X |
| 2,818,517 | 12/1957 | Loosjes | 310/156 |
| 3,477,125 | 11/1969 | Schwartz | 29/596 |

*Primary Examiner*—Charles W. Lanham
*Assistant Examiner*—Carl E. Hall
*Attorney*—Leonard Bloom et al.

[57] ABSTRACT

An improved method of producing armature sub-assemblies for electric motors is described. The completed sub-assembly includes a shaft, a stack of laminations and a commutator and an insulating tube disposed between at least the shaft and the stack of laminations. The method includes the steps of applying adhesive material to the various parts to cause bonding thereof.

7 Claims, 1 Drawing Figure

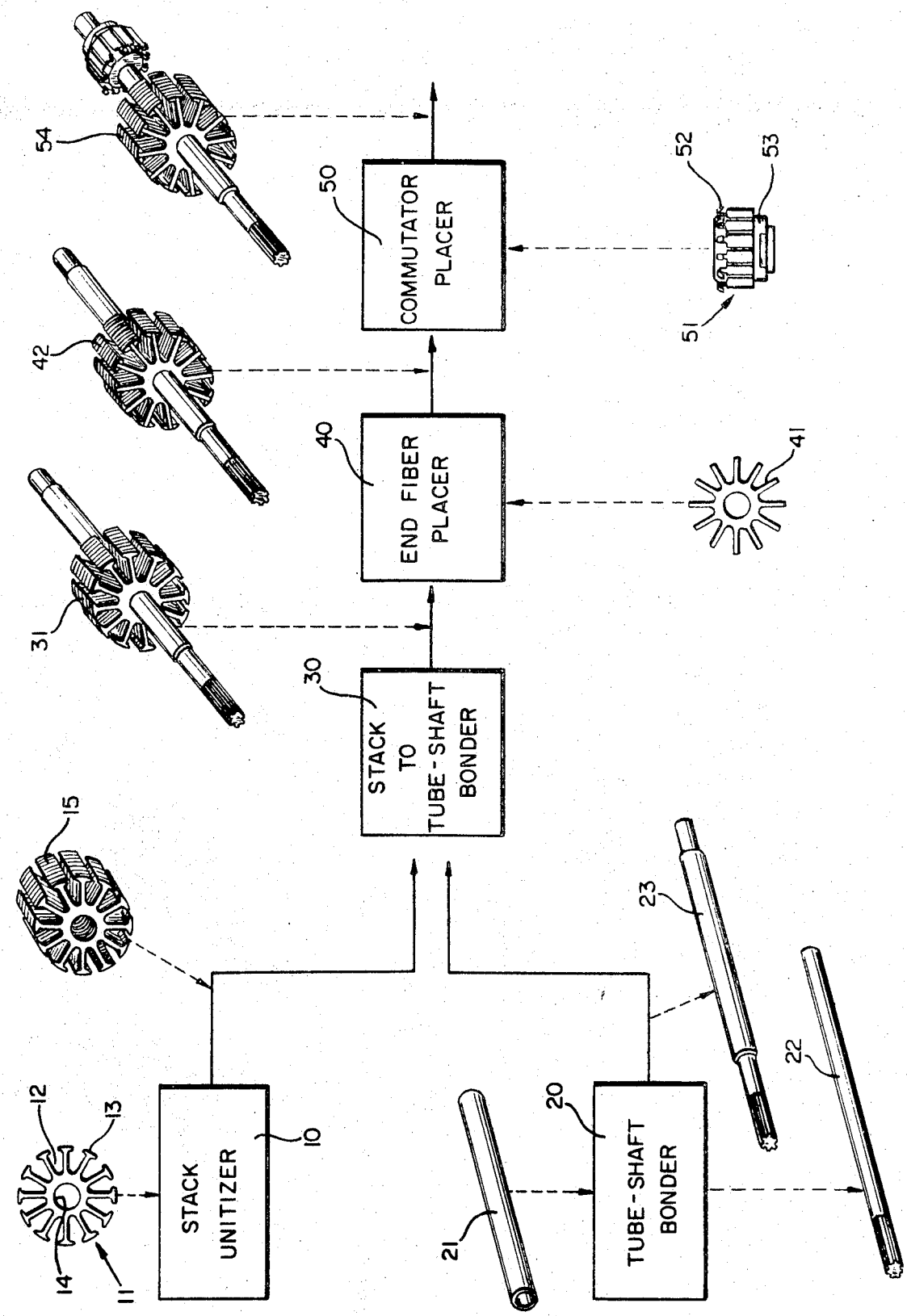

METHOD OF PRODUCING DOUBLE-INSULATED ARMATURE SUB-ASSEMBLIES

FIELD OF THE INVENTION

The present invention is directed broadly to armatures for use in universal or small D. C. electric motors and is more particularly directed to an improved method of making the armature described in U.S. Pat. No. 3,639,789 — Bednarski, issued Feb. 1, 1972 and assigned to the assignee of this invention.

BACKGROUND

Previously known methods of doubly insulating armatures by providing an insulating barrier between the laminations and the shaft generally include either the injection of a moldable material into a space between the two or preparing a suitable sleeve and press-fitting the various parts together. As is more completely set forth in the above-mentioned Bednarski patent, neither of these methods is suitable for large quantity, low cost mass production; in addition, both of these methods suffer disadvantages in terms of functional capability as compared to the insulating tube and double-adhesive barrier described in that patent.

In addition, a variety of patents exist which teach the concept of bonding various parts of laminated electrical structures together. However, none of these methods adequately provide for high quantity, low cost production of double insulated armatures. Accordingly, it is a purpose of the present invention to provide a new, unique method for producing bonded, double insulated armatures which is adapted to modern mass production techniques including automation.

OBJECTIVES

It is accordingly an object of this invention to provide a new and improved method of producing double-insulated armatures.

It is another object of this invention to provide a high speed, low cost method of producing bonded armature subassemblies.

It is also an object of this invention to provide a new and improved method of producing double-insulated armatures for electric motors which is adaptable to substantially complete automation.

Further objects and advantages of this invention will become apparent as the description and illustration thereof proceed.

Briefly, in accord with a preferred embodiment of this invention, the unique method includes the steps of providing a stack of laminations of appropriate size, unitizing the stack and sealing the internal surface of a bore through the stack; providing a shaft and a suitable insulative tube, for example, of paper, and bonding the tube to the shaft; assemblying the shaft-tube combination with the unitized stack and bonding this assembly together, and placing a commutator on the end of the shaft. Suitable insulation for preventing electrical connection between the armature stack and windings which are to be placed thereon may be added either during or following this process; in either case, once this is done, the armature is ready for further processing in accord with conventional practice, specifically, the winding of suitable coils of wire thereon.

In the drawings, the sole FIGURE is a flow chart representing the method according to this invention. Each stage in the flow chart is accompanied by a perspective illustration of the parts introduced at that station and of the partial subassembly which results therefrom.

As can be seen from the drawing, the illustrated process broadly includes the steps of preparing and utilizing a suitable stack of laminations, combining and bonding an insulative ture and a shaft, bonding the stack of laminations to the tube-shaft combination, placing end fibers on the stack, and finally adding the commutator to the assembly. Each of the steps will now be considered in more detail.

Block 10 of the drawing indicates a series of stations in which the stack of laminations is prepared. The laminations, one of which is illustrated at 11, are the conventional type suitable for use in universal and small D. C. electric motors wherein a series of coils are wound in a plurality of slots 12 separated by teeth 13 located in the steel lamination. A central bore 14 is provided for receiving a shaft-tube sub-assembly. The laminations are clean, preferably having been degreased prior to introduction to the stack unitizer.

Within the unitizer, the desired length of stack for a motor is selected and the laminations are moved into alignment in the stack by suitable means such as pins extending upwardly through the winding slots 12. In order to reduce excessive gaps due to bent laminations or burrs remaining after the punching operation, the stack is preferably subjected to a pressing operation. The aligned, compressed stack is then unitized to facilitate further handling. Although a welding step could be used to combine the laminations into a single, aligned unit, the process of this invention includes the step of applying an adhesive internally of the bore by a suitable applicator such as a needle which is passed through the bore and which is sized so that a small amount of adhesive is wiped onto the inner surface of the bore. While any suitable adhesive material may be applied, it is preferred to make use of an anaerobic adhesive which cures in the absence of air. For example, a polyacrylate resin of the kind described in U.S. Pat. No. 2,895,950 — Krieble is suitable, as are later developments of this type of compound. In particular, the liquid adhesive sold under the designation R C - 40 and R C - 75 by the Loctite Corporation of Newington, Connecticut are particularly suitable.

The adhesive is applied in the liquid state by wiping it along the inside of the central bore through the stack of laminations while the laminations are held under a light clamping force, for example, on the order of 40 psi. The stack has previously been subjected to a high pressure compression to remove large spaces between the laminations such as might be caused by bent laminations or burrs; however, the material used for the laminations is commercial quality sheet steel and the surface contains many microscopic imperfections. These are sufficient to maintain a small space between each pair of adjacent laminations and the liquid adhesive spreads over substantially the entire area between each pair of laminations by capillary action. For ease of processing, it is preferred to use a relatively high viscosity adhesive and preheat the stack of laminations so that the adhesive does not drip too easily from the applicator, but when it enters the laminations, it is raised to a higher temperature and flows readily so as to substantially cover the surface area. The temperature of the stack of laminations, the clamping force and the viscosity of the adhesive are preferably selected so that the adhesive extends as closely as possible to the tips of the lamination teeth, thus insuring an adequate bond between each pair of adjacent laminations.

In addition to the basic function of unitizing the stack in proper vertical and radial alignment, the adhesive applied to the bore of the stack also serves to seal the bore when it is cured so that there are no remaining capillary openings exposed in the bore. This is done to prevent adhesive applied later in the process from being drawn out of the bore as will be more fully explained hereinafter.

The anaerobic adhesive previously described is of particular benefit in this process. Specifically, other adhesives which are applied in a liquid form and which cure to a hardened state frequently present problems, such as providing for the release of solvent gases, etc. in order to allow them to harden. The anaerobic materials, on the other hand, cure quickly in the absence of air. Thus, the anaerobic material which spreads between the laminations and fills the space is totally deprived of air and quickly cures into a hardened state. No difficulties which might be encountered due to a partially liquid region in the middle of the bonded surface can exist since, in fact, the material in this region is deprived of air and thus must cure.

After application of the adhesive and withdrawal of the applicator, a short time is provided for the adhesive to cure. Preferably, this is done by retaining the parts in the unitizer machine. As a final operation, the center bore is reamed to remove portions of the adhesive which may remain within the bore and which would otherwise obstruct it. The resulting subassembly is a unitizer stack 15.

Operating in parallel with the stack unitizer 10 is a tube-shaft bonder 20 which adhesively bonds an insulating tube 21 to a metal shaft 22. As is set forth in the Bednarski patent, any insulating material of adequate strength may be used. In accord with the present invention, a tube made up of several layers of paper is preferred. Bonding is accomplished by positioning the shaft and tube in proper relative positions and providing a layer of adhesive between the two. More specifically, the preferred method includes the steps of holding the tube in position and moving the shaft upwardly past an adhesive nozzle which applies a bead of adhesive along the shaft. Preferably the shaft is rotated at the same time and oscillated past the nozzle at least twice so that the adhesive bead extends over a substantial portion of the surface area of the shaft.

To prevent the adhesive from being wiped off as the shaft re-enters the tube, a short counterbore is provided in the upper end of the tube which acts as a reservoir. The shaft and tube are then moved to a position where the shaft is inductively heated; this reduces the viscosity of the adhesive and permits capillary action to insure the spread of the adhesive over the entire length of the shaft-tube interface. Once again, an anaerobic adhesive is preferred to avoid any problems with curing the adhesive in the center portion of the shaft-tube sub-assembly. To insure that proper adhesion has been achieved within this sub-assembly, this stage may be concluded with a push tester which applies a predetermined force between the tube and the shaft and which suitably rejects or marks any sub-assembly which fails this test. The resultant tube-shaft combination is shown at 23.

The third stage of the process of this invention, block 30, comprises apparatus for bonding the completed stack 15 onto the shaft-tube sub-assembly 23. This unit is quite similar to the tube-shaft bonder 20 except that it is sized to receive the larger parts. The steps performed include relative positioning of the stack and the tube-shaft sub-assembly, applying adhesive to the outside of the tube and heating the stack and shaft. As in the case of the tube-shaft bonder, this is done by oscillating and rotating the tube past a dispensing needle to apply an adhesive bead diagonally around the circumference of the tube and to spread the adhesive along the interface between the tube and the central bore in the stack. Once again, the heating lowers the viscosity of the adhesive and insures flow, by capillary action, throughout this interface. The sealed bore of the stack, as accomplished by the stack unitizing process in stage 10, prevents the adhesive from being removed from the tube-bore interface by capillary-sized spaces which would otherwise exist between adjacent laminations.

An additional step has been found to be helpful in assuring complete bonding of the full sub-assembly. Specifically, due to the length of the tube-shaft interface in stage 20, the lower end of the tube does not always receive a full portion of adhesive. To complete this layer of bond material, the tube, before processing, is counterbored at both ends. As a first benefit, the tube can be placed in the tube-shaft bonder 20 with either end up. When the shaft-tube sub-assembly is introduced to stage 30, it is placed in the apparatus in such a manner that the end which was down in the tube-shaft bonder is up in the stack to tube-shaft bonder. After the stack has been bonded to the exterior of the tube, another dispensing needle applies a small drop of glue to the end of the tube which is up in this apparatus. This material enters the reservoir formed by the other counterbore and heat is applied to the shaft in this region by inductive heating. The newly applied adhesive material is immediately drawn by capillary action into any region at this end of the tube-shaft sub-assembly which was not filled with adhesive in stage 20 where it hardens, thus completing the layer of bonding material along the entire length of the inside of the tube. A pushout test may comprise the final operation in this stage to insure proper bonding between the stack and the tube, after which the assembly 31 is transferred along the line.

The next stage indicated in the drawing is the end fiber placer 40 which receives the completed stack-tube-shaft sub-assembly 31 and presses on insulating end fibers 41 to separate the end laminations of the stack from the end turns of the coils of wire which will be wound thereon. This machinery and operation is conventional; it is also noted that alternative methods of applying insulation, such as fluidized bed coating or epoxy coating may alternately be performed. These may be done at any stage of the process, for example, after placement of the commutator. By way of example, the sub-assembly as it would appear after placement of end fibers is illustrated at 42.

The following stage, 50, in the illustrated operation is that of placing a commutator 51 on the end of the subassembly 42. This is done in contemplation of the conventional mass production winding equipment which provides for automatic connection of the armature coils to tangs 52 on the commutator 51. In the illustrated system, the paper tube is of such a length that it extends under the commutator. Alternatively, the tube could be shorter and the commutator could be engaged with the shaft in any normal manner, such as press-fitting.

In the illustrated and preferred embodiment, the commutator is preheated by placing it in an oven to warm the molded bushing 53. A bead of adhesive is applied to the appropriate portion of the tube and the commutator is pressed over the adhesive and tube. A small chamfer on the end of the commutator assists in preventing the adhesive from being wiped ahead of the commutator, and the temperature of the molded material again causes capillary action to draw the adhesive from the region of the chamfer under the commutator and to spread it thoroughly around its interface with the tube. Again, the use of an anaerobic adhesive assists in insuring that a proper bond is obtained throughout this interface.

The final sub-assembly 54 thus includes a securely bonded combination of the shaft, insulating tube, stack and commutator; this assembly can readily be transferred and stored as required until the winding operation is performed.

The significant benefits of this process, however, reside in the unique and substantially improved method for the low cost, high quantity production of an assembly which, as set forth in the aforementioned patent to Bednarski, fully meets or exceeds the requirements as to torque, lifetime and, most significantly, double-insulation for electric motor armatures. The completed armature may be used in any commutator-type universal or small D.C. electric motor, of either the wound coil or permanent magnet type. With particular regard to the method of this invention, it is noted that the simple and straightforward flow of assembly operations is unique and avoids the unnecessary complexities frequently characteristic of the prior art. At the same time, each step is readily adaptable to automatic, high speed machinery, thus further reducing the difficulty of performance and cost. Accordingly, while a preferred embodiment of this invention has been schematically illustrated and thoroughly described in the foregoing specification, it is noted that many changes and modifications which will occur readily to those skilled in the art may be made while still utilizing the concepts of this invention as disclosed herein. Changes might also be made in the motor parts to which this method is applied; for example, providing a shaped bore to position the tube or to improve the bond strength by selective distribution of the adhesive. It is, therefore, intended that the appended claims cover all such changes and modifications as may fall within the true spirit and scope of this invention.

I claim:

1. A machine-performable method of high reliability for high speed, automated production of double-insulated electric motor armatures of the type including a plurality of laminations arranged in a stack having a central bore, said stack being mounted on a shaft, and an insulating tube disposed between said stack and said shaft, said method comprising the steps of assemblying a plurality of laminations to form said stack, applying an adhesive material in liquid form to the inside of the central bore through said stack, said adhesive entering between each pair of adjacent laminations by capillary action; curing said adhesive; providing a counterbore in an end of said tube; applying an adhesive to at least one of said shaft and said counterbore, said counterbore serving to insure the presence of an adequate quantity of said adhesive; spreading said adhesive between said shaft and said tube; bonding said insulating tube to said shaft by curing said adhesive material therebetween; and bonding said stack to said tube by providing an adhesive material therebetween.

2. A machine-performable method of high reliability for high speed automated production of double-insulated electric motor armatures of the type including a plurality of laminations arranged in a stack having a central bore, said stack being mounted on a shaft, and an insulating tube disposed between said stack and said shaft, said method comprising the steps of assemblying a plurality of laminations to form said stack, applying an adhesive material in liquid form to the inside of the central bore through said stack, said adhesive entering between each pair of adjacent laminations by capillary action; curing said adhesive; introducing an adhesive to one of said shaft and said tube; spreading said adhesive therebetween by relatively oscillating and rotating said shaft while positioned within said tube to distribute said adhesive therebetween; bonding said insulating tube to said shaft by curing said adhesive material therebetween; and bonding said stack to said tube by providing an adhesive material therebetween.

3. A machine-performable method of high reliability for high speed automated production of double-insulated electric motor armatures of the type including a plurality of laminations arranged in a stack having a central bore, said stack being mounted on a shaft, and an insulating tube disposed between said stack and said shaft, said method comprising the steps of assemblying a plurality of laminations to form said stack, applying an adhesive material in liquid form to the inside of the central bore through said stack, said adhesive entering between each pair of adjacent laminations by capillary action; curing said adhesive; bonding said insulating tube to said shaft by providing an adhesive material therebetween; providing an adhesive material between said stack and said tube; spreading said adhesive by relatively oscillating and rotating said stack while said tube is positioned within said stack to distribute said adhesive therebetween; and curing said adhesive.

4. A method as claimed in claim 1 wherein said adhesive between said shaft and said tube is spread therebetween by relatively oscillating and rotating said shaft and said tube to distribute said adhesive therebetween, said counterbore serving to prevent wiping during said relative movement.

5. A method as claimed in claim 3 wherein said tube is provided with a counterbore; said first applied adhesive is applied to said shaft and said shaft is thereafter inserted into said tube, said counterbore preventing wiping of said adhesive during said insertion and providing a reservoir for said adhesive.

6. A method as claimed in claim 4 wherein heat is applied to distribute said adhesive between said shaft and said tube.

7. A method as claimed in claim 1 wherein heat is applied to distribute said adhesive between said pairs of laminations.

* * * * *